April 29, 1947. G. A. BISHOP 2,419,878
RIVET HEATING POT
Filed Aug. 27, 1943 2 Sheets-Sheet 1

George A. Bishop, Inventor,
Atty.

April 29, 1947.  G. A. BISHOP  2,419,878
RIVET HEATING POT
Filed Aug. 27, 1943  2 Sheets-Sheet 2
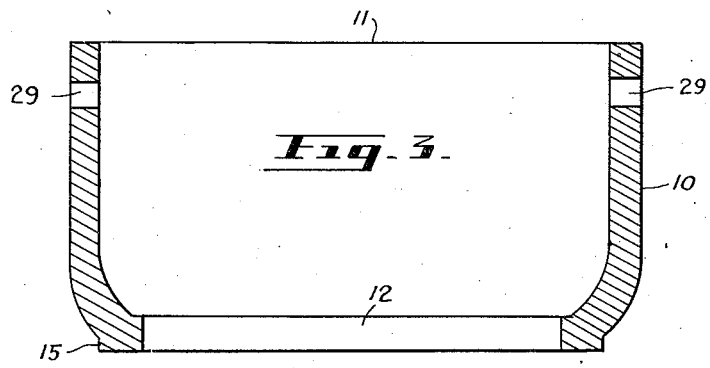
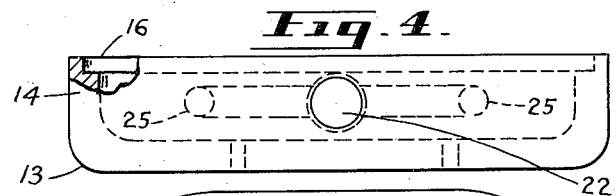
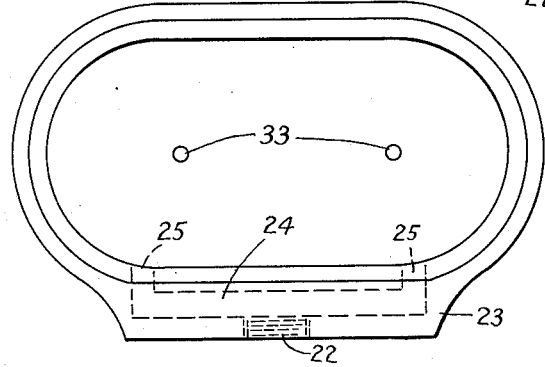
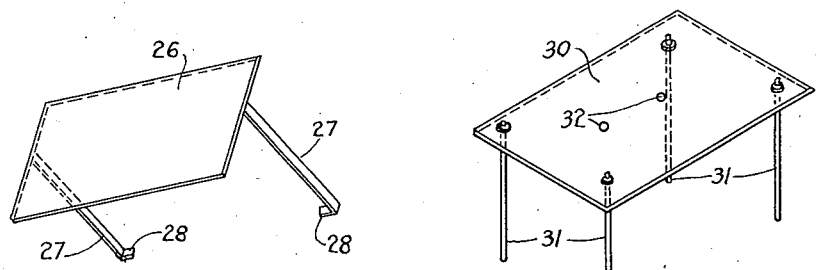
George A. Bishop, Inventor, Patented Apr. 29, 1947

2,419,878

UNITED STATES PATENT OFFICE 2,419,878

RIVET HEATING POT

George Albert Bishop, Vancouver, British Columbia, Canada

Application August 27, 1943, Serial No. 500,299

1 Claim. (Cl. 110—3.5)

This invention relates to new and useful improvements in a rivet heating pot. Its primary object being to provide an improved receptacle for heating rivets and the like wherein economy of fuel and air pressure are attained.

Another object of the invention is to increase the capacity of the pot to that in use heretofore and at the same time reduce the air pressure required to operate the fire.

Still another object of the invention is to devise a rivet heating pot wherein the rivets may be laid on their sides instead of being stood on end as in pots presently in use and wherein the rivets are frequently overheated or burned on the lower end before the upper end is brought to the correct temperature. By laying all rivets on their side they are heated evenly throughout their length to the same temperature and are at all times visible so that they may be removed for use at the proper time.

With these and other objects in view that may appear while the description proceeds the invention resides in the novel design and arrangement of parts as hereinafter more fully described and shown in the accompanying drawings forming part of this application and in which:

Fig. 3 is a sectional elevation view of the pot.

Fig. 4 is an elevation of the base.

Fig. 5 is a plan view of the base;

Fig. 6 is a perspective view of the cover;

Fig. 7 is a perspective view of the stand.

Figure 1:
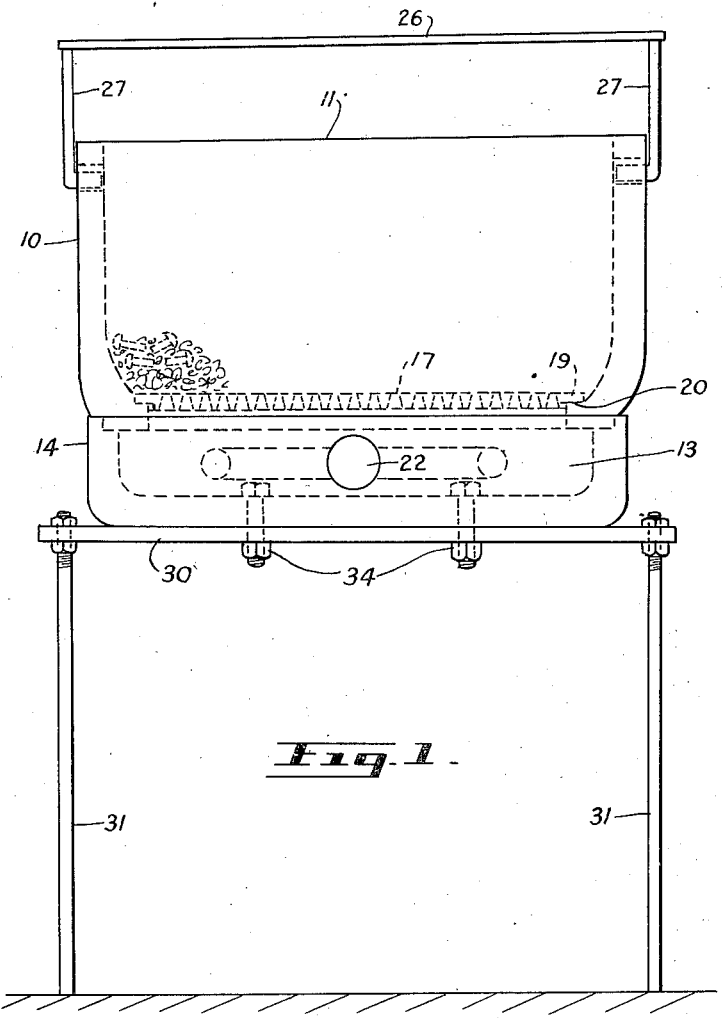
Fig. 1 is a general assembly view of my improved rivet heating pot.
Figure 2:
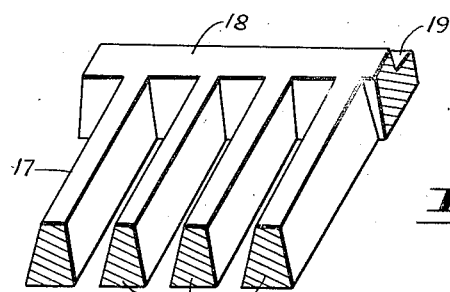
Fig. 2 is a fragmentary perspective view of the grate.

Referring more in detail to the drawings in which similar reference characters designate corresponding parts throughout the several views it will be seen the invention consists of an oval shaped pot 10, having an open top 11, and apertured bottom 12.

The pot 10, is arranged to rest on a base 13, having an upturned rim 14 around the outer edge of same. An annular flange 15, on the bottom of the pot 10, is provided to engage an annular seat 16, in the top edge of the base rim 14, and by means of which the pot is retained in position on the base. The grate 17, consists of an outer frame member 18, arranged to fit within the apertured bottom of the pot 10, and is provided with an annular flange 19, which rests on the bottom of the pot at 20, and thereby holds the grate in position. The grate 17, is provided with a plurality of spaced apart lateral bars 21, which support the fuel.

Air is admitted to the base through an aperture 22, which is formed in an elongated boss 23, on one side of the base. Said aperture is threaded to receive an air hose by means of which the air is supplied under pressure. Within the boss 23, is an air conduit 24, having two ports 25, into the base proper. These ports 25, are spaced apart near opposite ends of the base to distribute the air evenly therein.

A cover 26, is provided for the pot and is held thereon and in spaced apart relation to the top of the pot as shown to permit the escape of smoke and gas by means of two rectangular spring arms 27 having rectangular lugs 28, which fit into apertures 29, in the sides of the pot 10.

A stand is also provided to support the pot and base and consists of a metal plate 30, having four legs 31, suitably secured thereto. Two central apertures 32 are provided to correspond with two similar apertures 33, in the base to receive bolts 34, to secure the said base to the stand.

From the foregoing description it will be seen the device is set up or assembled as shown in Fig. 1. The cover 26, and pot 10, are readily demountable from the base. The former for the purpose of refuelling or putting the rivets on the fire or taking them off the fire and the latter for the purpose of cleaning. The grate is similarly demountable for cleaning purposes.

In operation air is supplied under pressure by means of an air hose detachably secured in the air intake aperture. Regulating means consisting of an air valve would be provided to control the air pressure. The fire is built on the grate in the ordinary way and the rivets laid thereon to be heated.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrangement of cooperating parts may be resorted to within the scope of what is claimed without departing from the spirit of the invention.

I claim:

A heating device comprising an elongated pot having an open bottom, a grate extending across the open bottom of said pot and seated therein, an elongated base surrounded by an upturned rim for supporting said pot in spaced relation to said base, a boss formed on one side of the rim of said base having an air conduit formed therein extending longitudinally of said base with its ends in open communication with the space between said pot and base, said conduit having an air inlet intermediate its ends, a cover for said pot, and spring arms depending from said cover having inturned ends adapted to engage in apertures in the sides of said pot to detachably secure said cover in position.

GEORGE ALBERT BISHOP.

REFERENCES CITED

The following references are of record in the file of this patent:

UNITED STATES PATENTS

| Number | Name | Date |
|---|---|---|
| 230,955 | McGee | Aug. 10, 1880 |
| 1,243,816 | Crawford | Dec. 4, 1917 |
| 1,276,836 | Tripp et al. | Aug. 27, 1918 |
| 1,318,358 | Crawford | Oct. 14, 1919 |
| 592,193 | Brewer et al. | Oct. 19, 1897 |
| 516,748 | Wagener | Mar. 20, 1894 |
| 488,235 | Webb | Dec. 20, 1892 |
| 1,248,816 | Tripp | Dec. 4, 1917 |
| 747,648 | Scanlan | Dec. 22, 1903 |
| 838,364 | Sullivan | Dec. 11, 1906 |
| 115,921 | Woodhouse | June 13, 1871 |